United States Patent [19]
Maehama et al.

[11] Patent Number: 6,034,187
[45] Date of Patent: Mar. 7, 2000

[54] CATALYST FOR OLEFIN POLYMERIZATION AND PROCESS FOR PRODUCTION OF OLEFIN POLYMER

[75] Inventors: Seiji Maehama; Akihiro Yano; Morihiko Sato, all of Mie, Japan

[73] Assignee: Tosoh Corporation, Yamaguchi, Japan

[21] Appl. No.: 09/081,942

[22] Filed: May 21, 1998

[30] Foreign Application Priority Data

May 27, 1997 [JP] Japan .................................. 9-136632

[51] Int. Cl.[7] ........................................ C08F 2/00
[52] U.S. Cl. ................ 526/72; 502/62; 502/63; 502/80; 502/84
[58] Field of Search ................ 502/62, 63, 80, 502/84; 526/72

[56] References Cited

FOREIGN PATENT DOCUMENTS

| | | |
|---|---|---|
| 0 658 576 | 6/1995 | European Pat. Off. . |
| 0 727 443 | 8/1996 | European Pat. Off. . |
| 7-228621 | 8/1995 | Japan . |
| 1 480 530 | 7/1977 | United Kingdom . |

OTHER PUBLICATIONS

Database WPI Section Ch, Week 9543 Derwent Publications Ltd., AN 95–332545, JP 07 228 621 A (abstract).

*Primary Examiner*—Thomas Dunn
*Attorney, Agent, or Firm*—Sughrue, Mion, Zinn, Macpeak & Seas, PLLC

[57] ABSTRACT

A novel catalyst for polymerization of olefin is provided which comprises a modified clay compound (a) having an average particle diameter of less than 10 $\mu$m, a transition metal compound (b), and an organoaluminum compound (c). This catalyst exhibits improved initial polymerization behavior, and produces an olefin polymer of less ash content at a high productivity.

10 Claims, No Drawings

CATALYST FOR OLEFIN POLYMERIZATION AND PROCESS FOR PRODUCTION OF OLEFIN POLYMER

BACKGROUND OF THE INVENTION

1. Field of the Invention

The present invention relates to a novel olefin polymerization catalyst comprising a modified clay compound having an average particle diameter of less than 10 µm, a transition metal compound, and an organoaluminum compound, and to a process for production of an olefin polymer employing the catalyst.

2. Description of the Related Art

Catalyst systems comprising a combination of a transition metal compound and an organoaluminum compound are known for polymerization of olefins to produce an olefin polymer. Kaminsky, et al. disclosed a catalyst comprising a metallocene and methylaluminoxane having high activity in production of a polymer of an olefin including propylene in JP-A-58-19309.

The above catalyst system has some disadvantages, although it has high activity for olefin polymerization. The catalyst system, which is soluble in the reaction system, is usually employed in solution polymerization systems, limiting the production process. Relatively expensive methylaluminoxane is necessary in a large amount for production of a polymer having industrially useful properties. Therefore, the catalyst system causes a high production cost and a larger amount of residual aluminum remaining in the produced polymer, disadvantageously.

JP-A-60-35006, and other documents disclose catalyst systems in which the aforementioned soluble catalyst is supported by an inorganic oxide carrier like silica. However, as the results of replication tests of the disclosed methods, the catalyst activity was not sufficiently high for the amount of the employed methylaluminoxane.

For improvement thereof, JP-A-4-8704, JP-A-4-11604, JP-A-4-213305, and so forth disclose gas-phase polymerization processes in which a catalyst system having been treated by preliminary polymerization with a small amount of methylaluminoxane is used to obtain a polymer having satisfactory particle properties with high polymerization activity. Even in these processes, the catalyst activity is not sufficient although the amount of the aluminoxane used is small. Therefore, higher activity of the catalyst system has been demanded.

JP-A-1-503788 describes production of ethylene/α-olefin copolymer with a transition metal compound-aluminoxane catalyst by a high-pressure high-temperature process. However, industrial use of such a catalyst in a large scale involves problems that the methylaluminoxane cannot readily be synthesized with reproducibility as mentioned above, and the ratio of the expensive methylaluminoxane to the transition metal has to be significantly high to achieve sufficient activity.

JP-A-5-295022 and JP-A-7-309907 disclose solid catalyst systems employing a clay mineral or the like. However, the polymerization activity thereof is not satisfactory.

JP-A-7-224106 discloses catalyst system employing a clay modified by a cationic compound as the cocatalyst. This catalyst system is not satisfactory in process suitability. For example, the solid catalyst makes difficult the control of the particle size of the polymer powder in slurry polymerization or gas phase polymerization, producing coarse polymer particles adversely affecting the polymer properties. Further, the solid catalyst is not suitable for a high-pressure process or a solution process in which the residence time is short.

After comprehensive investigation to solve the above problems, it was found by the inventors of the present invention that a catalyst comprising a specific clay compound having a specified particle diameter, a transition metal compound, and an organoaluminum compound has high activity in an olefin polymerization process. The present invention has been accomplished based on the above findings.

SUMMARY OF THE INVENTION

The present invention intends to provide a novel olefin polymerization catalyst suitable for producing an olefin polymer having excellent properties for high-quality products.

The present invention intends also to provide a process for production of an olefin polymer employing the olefin polymerization catalyst.

According to an aspect of the present invention, there is provided an olefin polymerization catalyst comprising a modified clay compound (a) having an average particle diameter of less than 10 µm, a transition metal compound (b), and an organoaluminum compound (c).

According to another aspect of the present invention, there is provided a process for polymerizing or copolymerizing one or more linear, branched, or cyclic olefins in the presence of the above olefin polymerization catalyst.

DETAILED DESCRIPTION OF THE PREFERRED EMBODIMENTS

The olefin polymerization catalyst of the present invention comprises a modified clay compound (a) having an average particle diameter of less than 10 µm, a transition metal compound (b), and an organoaluminum compound (c).

The modified clay compound (a) is not limited in the present invention, provided that the modified clay compound has an average particle diameter of less than 10 µm. With a modified clay compound of the average particle diameter of 10 µm or more, the resulting catalyst has low polymerization activity for a unit quantity of the transition metal which is uneconomic, or such a catalyst tends to produce a polymer of a larger particle size in spite of the high catalyst activity. Such a larger particle size of polymer powder is disadvantageous. For example, in slurry polymerization, a powdery polymer of a larger particle size is not readily centrifuged for solid-liquid separation. In gas-phase polymerization, the polymer of a larger particle size requires larger power for fluidization, agitation or mixing which is uneconomic. Further, in polymer pelletization, the polymer of a larger particle size is liable not to be completely melted to cause deterioration of polymer properties. In particular, in a two-stage or multi-stage slurry or gas-phase process, the influence is significant in production of a polymer of a grade which requires compatibility of a higher molecular weight component and a lower molecular weight component. The polymer produced by a catalyst system employing a modified clay compound of an average particle size of 10 µm or more has an insufficient bulk density which is disadvantageous to the process. In transportation of the catalyst in a slurry state from a catalyst reservoir to a reactor, the catalyst derived by use of the modified clay compound of an average particle diameter of 10 µm or more is liable to precipitate to cause clogging in a pump, or other troubles. Furthermore, in high temperature polymerization at a temperature of 100° C. or higher, the catalyst of a larger particle size gives a lower initial polymerization rate, which is not suitable for a high pressure process or a solution process in which the residence time is short.

If an unmodified clay compound is used in place of the modified one, the resulting catalyst has a low activity for the transition metal, which is uneconomical.

The modified clay compound (a) having an average particle diameter of less than 10 μm used for the olefin polymerization catalyst of the present invention is prepared artificially by chemical treatment of a laminar clay compound (a-1). The chemical treatment includes (1) chemical treatment with an acid or an alkali, (2) treatment with a salt, (3) composite formation by inorganic compound treatment, (4) composite formation by organic compound treatment, and so forth. The preferred chemical treatment is composite formation by organic compound treatment, in particular treatment with an ionic organic compound (a-2).

The laminar clay compound (a-1) for constituting the olefin polymerization catalyst of the present invention is a fine particulate matter composed mainly of a fine crystalline silicate salt. The laminar clay compound has a characteristic laminar structure in which various moieties having various negative charges exist in the layer structure. In this respect, the laminar clay compound differs greatly from metal oxides of a three-dimensional structure such as silica, alumina, and zeolite. The clay minerals are classified according to the quantity of the aforementioned negative charge into groups: the group of pyrophylite, kaolinite, dickite, and talcs having the negative charge of zero; the group of smectites having the negative charge of 0.25–0.6; the group of vermiculites having the negative charge of 0.6–0.9; the group of micas having the negative charge of about 1; and the group of brittle micas having the negative charge of about 2. Each of the above groups includes various minerals. The clay minerals of the smectite group include montmorillonite, bidelite, saponite, and hectorite. These clay minerals may be of natural origin, or may be artificially synthesized with less impurities. In the present invention, any of the natural clay minerals and artificially synthesized clay minerals shown above may be used. Further, any other minerals defined as the clay mineral may be used in the present invention.

The ionic organic compound (a-2) preferred for constituting the modified clay compound in the present invention includes onium compounds shown by formula (29) in which a proton is bonded by coordination to a lone electron pair of an element.

$$[R^{19}{}_nGH]^+[A]^-  \quad (29)$$

In the formula, G is an element selected from Groups 15 and 16 of Periodic Table, G specifically including a nitrogen atom to form an ammonium compound, a phosphorus atom to form a phosphonium compound, an oxygen atom to form an oxonium compound, and a sulfur atom to form a sulfonium compound. Each $R^{19}$ is independently a hydrogen atom or a hydrocarbon group of 1 to 20 carbons, specifically the hydrocarbon group including $C_1$–$C_{20}$ alkyl groups such as methyl, ethyl, propyl, butyl, pentyl, hexyl, heptyl, octyl, nonyl, decyl, dodecyl, isopropyl, isobutyl, s-butyl, t-butyl, and cyclohexyl; $C_1$–$C_{20}$ alkenyl groups such as vinyl, propenyl, and cyclohexenyl; $C_6$–$C_{20}$ aryl groups such as phenyl, methylphenyl, ethylphenyl, biphenyl, and naphthyl; and $C_7$–$C_{20}$ arylalkyl groups such as benzyl, and phenylethyl. At least one $R^{19}$ is a hydrocarbon group of 1 to 20 carbons, and the $R^{19}$ groups may be linked together. For G selected from Group 15, n=3, and for G selected from Group 16, n=2. $[A]^-$ is a counter ion, exemplified by inorganic anions including halogen ions such as fluorine ion, chlorine ion, bromine ion, and iodine ion; and sulfate ion, but is not limited thereto.

The above compound, when G is a nitrogen atom and $[A]^-$ is chlorine ion, includes specifically aliphatic primary amine hydrochlorides such as methylamine hydrochloride, ethylamine hydrochloride, propylamine hydrochloride, isopropylamine hydrochloride, butylamine hydrochloride, hexylamine hydrochloride, decylamine hydrochloride, dodecylamine hydrochloride, allylamine hydrochloride, cyclopentylamine hydrochloride, and cyclohexylamine hydrochloride; aliphatic secondary amine hydrochlorides such as dimethylamine hydrochloride, diethylamine hydrochloride, diamylamine hydrochloride, didecylamine hydrochloride, and diallylamine hydrochloride; aliphatic tertiary amine hydrochlorides such as trimethylamine hydrochloride, tributylamine hydrochloride, triamylamine hydrochloride, triallylamine hydrochloride, N,N-dimethyldecylamine hydrochloride, and N,N-dimethylundecylamine hydrochloride; and aromatic amine hydrochlorides such as aniline hydrochloride, N-methylaniline hydrochloride, N,N-dimethylaniline hydrochloride, N-ethylaniline hydrochloride, N,N-diethylaniline hydrochloride, N-allylaniline hydrochloride, o-toluidine hydrochloride, m-toluidine hydrochloride, p-toluidine hydrochloride, N-methyl-o-toluidine hydrochloride, N-methyl-m-toluidine hydrochloride, N-methyl-p-toluidine hydrochloride, N,N-dimethyl-o-toluidine hydrochloride, N,N-dimethyl-m-toluidine hydrochloride, N,N-dimethyl-p-toluidine hydrochloride, benzylamine hydrochloride, dibenzylamine hydrochloride, tribenzylamine hydrochloride, N-benzyl-N-ethylaniline hydrochloride, diphenylamine amine hydrochloride, α-naphthylamine hydrochloride, β-naphthylamine hydrochloride, N,N-dimethyl-α-naphthylamine hydrochloride, N,N-dimethyl-β-naphthylamine hydrochloride, o-anisidine hydrochloride, m-anisidine hydrochloride, p-anisidine hydrochloride, N,N,2,6-tetramethylaniline hydrochloride, N,N-3,5-tetramethylaniline hydrochloride, N,N,2,4,6-pentamethylaniline hydrochloride, and 2,3,4,5,6-pentafluoroaniline hydrochloride. The above compound also includes hydrofluorides, hydrobromides, hydroiodides and sulfates derived by replacing the chlorine ion as [A] of the above amine hydrochloride by a fluorine ion, bromine ion, iodide ion, or sulfate ion, but is not limited thereto. When G is a phosphorus atom and $[A]^-$ is bromine ion, the compound includes specifically phosphonium compounds such as triphenylphosphine hydrobromide, tri(o-tolyl)phosphine hydrobromide, tri(p-tolyl)phosphine hydrobromide, and tri(mesityl)phosphine hydrobromide, but is not limited thereto. When G is an oxygen atom and $[A]^-$ is a chlorine ion, the compound includes specifically oxonium compounds such as methyl ether hydrochloride, ethyl ether hydrochloride, and phenyl ether hydrochloride, but is not limited thereto. The compound includes also a sulfonium compound in which G is a sulfur atom.

In the reaction of the laminar clay compound (a-1) and the ionic organic compound (a-2), the reaction condition is not limited. The two compounds are preferably brought into contact with each other in water or in a usually used organic solvent such as ethyl alcohol, methyl alcohol, acetone, 1,4-dioxane, acetonitrile, benzene, toluene, xylene, pentane, hexane, and methylene chloride. The compound (a-2) may be prepared once in a solid state and then dissolved in the solvent, or may be prepared by chemical reaction in the solvent as a solution of the compound (a-2). The ratio of the compound (a-1) to the compound (a-2) to be reacted is not limited. However, in the case where the compound (a-1) contains exchangeable cation, the compound (a-2) is allowed to react preferably in an amount of not less than 0.5 equivalent, more preferably not less 1 equivalent to the cation.

The modified clay con-pound (a) having an average particle diameter of less than 10 µm for constituting the olefin polymerization catalyst of the present invention can be effectively produced in a mechanical method such as a spray granulation method, a jet mill method, a vibration ball mill method, and a supermicron mill method, but the production method is not limited to the mechanical methods.

The modified clay compound (a) having an average particle diameter of less than 10 µm may be produced by adjusting the laminar clay compound (a-1) to an average particle diameter of less than 10 µm and subsequently modifying it, or by firstly modifying the laminar clay compound (a-1) and subsequently adjusting it.

The transition metal compound (b) used for preparing the olefin polymerization catalyst in one aspect of the present invention is a compound of a transition metal of Group 4 of Periodic Table represented by General Formula (1) or (2):

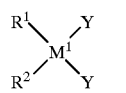

(1)

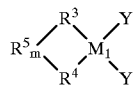

(2)

where $M^1$ is an atom of titanium, zirconium, or hafnium; each Y is independently a hydrogen atom, a halogen atom, an alkyl group of 1 to 20 carbons, or an aryl, arylalkyl, or alkylaryl group of 6 to 20 carbons; $R^1$, and $R^2$ are independently a ligand represented by General Formula (3), (4), (5), or (6):

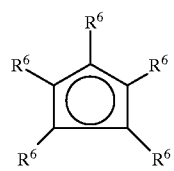

(3)

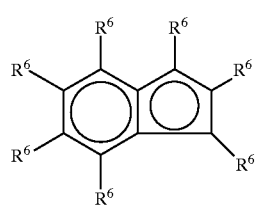

(4)

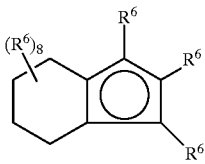

(5)

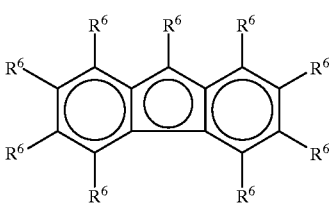

(6)

(where each $R^6$ is independently a hydrogen atom, an alkyl group of 1 to 20 carbons, or an aryl, arylalkyl, or alkylaryl group of 6 to 20 carbons); the ligands forming a sandwich structure together with $M^1$; $R^3$, and $R^4$ are independently a ligand represented by General Formula (7), (8), (9), or (10):

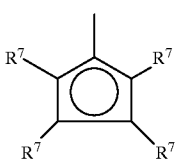

(7)

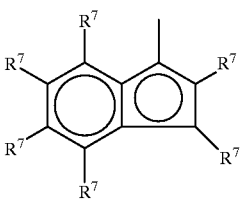

(8)

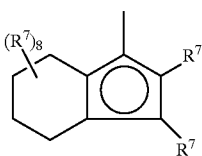

(9)

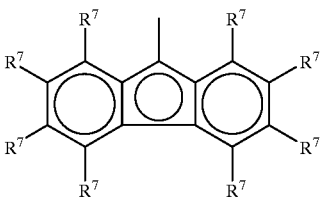

(10)

(where each $R^7$ is independently a hydrogen atom, an alkyl group of 1 to 20 carbons, or an aryl, arylalkyl, or alkylaryl group of 6 to 20 carbons); the ligands forming a sandwich structure together with $M^1$; $R^5$ is a group represented by General Formula (11) or (12):

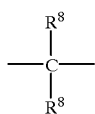

(11)

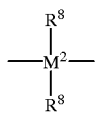

(12)

(where each $R^8$ is independently a hydrogen atom, an alkyl group of 1 to 20 carbons, or an aryl, arylalkyl, or alkylaryl group of 6 to 20 carbons; and $M^2$ is an atom of silicon, germanium, or tin), $R^5$ forming a bridge between $R^3$ and $R^4$; and m is an integer of 1 to 5.

In another aspect of the present invention, the transition metal compound (b) is a compound of a transition metal of Group 4 of periodic Table represented by General Formula (13), (14), (15), or (16):

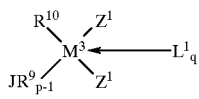

(13)

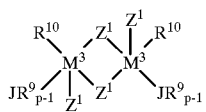

(14)

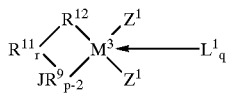

(15)

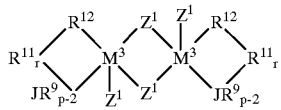

(16)

where each $M^3$ is independently an atom of titanium, zirconium, or hafnium; each $Z^1$ is independently a hydrogen atom, a halogen atom, an alkyl group of 1 to 20 carbons, or an aryl, arylalkyl, or alkylaryl group of 6 to 20 carbons; $L^1$ is a Lewis base; q is an integer of 0 to 3; $JR^9_{p-1}$ and $JR^9_{p-2}$ are respectively a heteroatom ligand, J being an element of Group 15 of Periodic Table having a coordination number 3 or an element of Group 16 of Periodic Table having a coordination number 2; each $R^9$ is independently a hydrogen atom, a halogen atom, an alkyl or alkoxy group of 1 to 20 carbons, or an aryl, aryloxy, arylalkyl, arylalkoxy, alkylaryl, or alkylaryloxy group of 6 to 20 carbons; p is a coordination number of the element J; each $R^{10}$ is independently a ligand represented by General Formula (17), (18), (19), or (20):

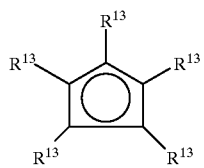

(17)

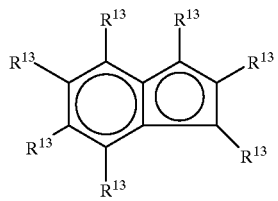

(18)

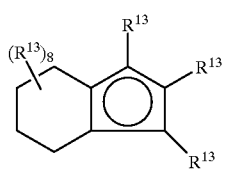

(19)

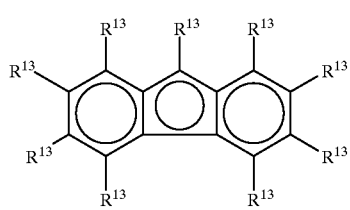

(20)

(where each $R^{13}$ is independently a hydrogen atom, an alkyl group of 1 to 20 carbons, or an aryl, arylalkyl, or alkylaryl group of 6 to 20 carbons); each $R^{12}$ is a ligand represented by General Formula (21), (22), (23), or (24):

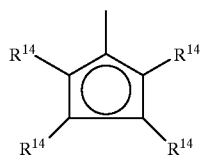

(21)

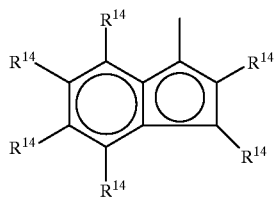

(22)

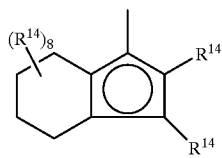

(23)

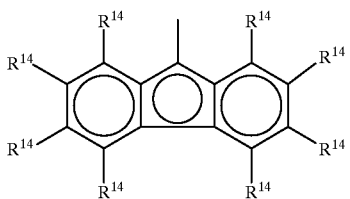
(24)

(where each $R^{14}$ is independently a hydrogen atom, an alkyl group of 1 to 20 carbons, or an aryl, arylalkyl, or alkylaryl group of 6 to 20 carbons);

$R^{11}$ is a group represented by General Formula (25) or (26):

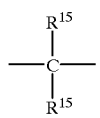
(25)

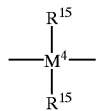
(26)

(where each $R^{15}$ is independently a hydrogen atom, an alkyl group of 1 to 20 carbons, or an aryl, arylalkyl, or alkylaryl group of 6 to 20 carbons; and $M^4$ is an atom of silicon, germanium, or tin), $R^{11}$ forming a bridge between $R^{12}$ and $JR^9_{p-2}$; and r is an integer of 1 to 5.

The compound represented by General Formula (1) or (2) includes dichlorides of the transition metals such as
bis(cyclopentadienyl)titanium dichloride,
bis(cyclopentadienyl)zirconium dichloride,
bis(cyclopentadienyl)hafnium dichloride,
bis(methylcyclopentadienyl)titanium dichloride,
bis(methylcyclopentadienyl)zirconium dichloride,
bis(methylcyclopentadienyl)hafnium dichloride,
bis(butylcyclopentadienyl)titanium dichloride,
bis(butylcyclopentadienyl)zirconium dichloride,
bis(butylcyclopentadienyl)hafnium dichloride,
bis(pentamethylcyclopentadienyl)titanium dichloride,
bis(pentamethylcyclopentadienyl)zirconium dichloride,
bis(pentamethylcyclopentadienyl)hafnium dichloride,
bis(indenyl)titanium dichloride,
bis(indenyl)zirconium dichloride,
bis(indenyl)hafnium dichloride,
methylenebis(cyclopentadienyl)titanium dichloride,
methylenebis(cyclopentadienyl)zirconium dichloride,
methylenebis(cyclopentadienyl)hafnium dichloride,
methylenebis(methylcyclopentadienyl)titanium dichloride,
methylenebis(methylcyclopentadienyl)zirconium dichloride,
methylenebis(methylcyclopentadienyl)hafnium dichloride,
methylenebis(butylcyclopentadienyl)titanium dichloride,
methylenebis(butylcyclopentadienyl)zirconium dichloride,
methylenebis(butylcyclopentadienyl)hafnium dichloride,
methylenebis(tetramethylcyclopentadienyl)titanium dichloride,
methylenebis(tetramethylcyclopentadienyl)zirconium dichloride,
methylenebis(tetramethylcyclopentadienyl)hafnium dichloride,
ethylenebis(indenyl)titanium dichloride,
ethylenebis(indenyl)zirconium dichloride,
ethylenebis(indenyl)hafnium dichloride,
ethylenebis(tetrahydroindenyl)titanium dichloride,
ethylenebis(tetrahydroindenyl)zirconium dichloride,
ethylenebis(tetrahydroindenyl)hafnium dichloride,
ethylenebis(2-methyl-1-indenyl)titanium dichloride,
ethylenebis(2-methyl-1-indenyl)zirconium dichloride,
ethylenebis(2-methyl-1-indenyl)hafnium dichloride,
isopropylidene(cyclopentadienyl-9-fluorenyl)titanium dichloride,
isopropylidene(cyclopentadienyl-9-fluorenyl)zirconium dichloride,
isopropylidene(cyclopentadienyl-9-fluorenyl)hafnium dichloride,
isopropylidene(cyclopentadineyl-2,7-dimethyl-9-fluorenyl)titanium dichloride,
isopropylidene(cyclopentadineyl-2,7-dimethyl-9-fluorenyl)zirconium dichloride,
isopropylidene(cyclopentadineyl-2,7-dimethyl-9-fluorenyl)hafnium dichloride,
isopropylidene(cyclopentadineyl-2,7-di-t-butyl-9-fluorenyl)titanium dichloride,
isopropylidene(cyclopentadineyl-2,7-di-t-butyl-9-fluorenyl)zirconium dichloride,
isopropylidene(cyclopentadineyl-2,7-di-t-butyl-9-fluorenyl)hafnium dichloride,
diphenylmethylene(cyclopentadienyl-9-fluorenyl)titanium dichloride,
diphenylmethylene(cyclopentadienyl-9-fluorenyl)zirconium dichloride,
diphenylmethylene(cyclopentadienyl-9-fluorenyl)hafnium dichloride,
diphenylmethylene(cyclopentadienyl-2,7-dimethyl-9-fluorenyl)titanium dichloride,
diphenylmethylene(cyclopentadienyl-2,7-dimethyl-9-fluorenyl)zirconium dichloride,
diphenylmethylene(cyclopentadienyl-2,7-dimethyl-9-fluorenyl)hafnium dichloride,
diphenylmethylene(cyclopentadienyl-2,7-di-t-butyl-9-fluorenyl)titanium dichloride,
diphenylmethylene(cyclopentadienyl-2,7-di-t-butyl-9-fluorenyl)zirconium dichloride,
diphenylmethylene(cyclopentadienyl-2,7-di-t-butyl-9-fluorenyl)hafnium dichloride,
dimethylsilanediylbis(cyclopentadienyl)titanium dichloride,
dimethylsilanediylbis(cyclopentadienyl)zirconium dichloride,
dimethylsilanediylbis(cyclopentadienyl)hafnium dichloride,
dimethylsilanediylbis(methylcyclopentadienyl)titanium dichloride,
dimethylsilanediylbis(methylcyclopentadienyl)zirconium dichloride,
dimethylsilanediylbis(methylcyclopentadienyl)hafnium dichloride,
dimethylsilanediylbis(butylcyclopentadienyl)titanium dichloride,
dimethylsilanediylbis(butylcyclopentadienyl)zirconium dichloride,
dimethylsilanediylbis(butylcyclopentadienyl)hafnium dichloride,
dimethylsilanediylbis(2,4,5-trimethylcyclopentadienyl)titanium dichloride,
titanium dimethylsilanediylbis(2,4-dimethylcyclopentadienyl)titanium dichloride,
dimethylsilanediylbis(3-methylcyclopentadienyl)titanium dichloride, dimethylsilanediylbis(4-t-butyl-2-methylcyclopentadienyl)titanium dichloride,
dimethylsilanediylbis(tetramethylcyclopentadienyl)titanium dichloride,
dimethylsilanediylbis(indenyl)titanium dichloride,
dimethylsilanediylbis(2-methyl-1-indenyl)titanium dichloride,
dimethylsilanediylbis(tetrahydroindenyl)titanium dichloride,
dimethylsilanediyl(cyclopentadienyl-9-fluorenyl)titanium dichloride,
dimethylsilanediyl(cyclopentadienyl-2,7-dimethyl-9-fluorenyl)titanium dichloride,
dimethylsilanediyl(cyclopentadienyl-2,7-di-t-butyl-9-fluorenyl)titanium dichloride,
dimethylsilanediylbis(2,4,5-trimethylcyclopentadienyl)zirconium dichloride,
dimethylsilanediylbis(2,4-dimethylcyclopentadienyl)zirconium dichloride,
dimethylsilanediylbis(3-methylcyclopentadienyl)zirconium dichloride,
dimethylsilanediylbis(4-t-butyl-2-methylcyclopentadienyl)zirconium dichloride,
dimethylsilanediylbis(tetramethylcyclopentadienyl)zirconium dichloride,
dimethylsilanediylbis(indenyl)zirconium dichloride,
dimethylsilanediylbis(2-methyl-1-indenyl)zirconium dichloride,
dimethylsilanediylbis(tetrahydroindenyl)zirconium dichloride,
dimethylsilanediyl(cyclopentadienyl-9-fluorenyl)zirconium dichloride,
dimethylsilanediyl(cyclopentadienyl-2,7-dimethyl-9-fluorenyl)zirconium dichloride,
dimethylsilanediyl(cyclopentadienyl-2,7-di-t-butyl-9-fluorenyl)zirconium dichloride,
dimethylsilanediylbis(2,4,5-trimethylcyclopentadienyl)hafnium dichloride,
dimethylsilanediylbis(2,4-dimethylcyclopentadienyl)hafnium dichloride,
dimethylsilanediylbis(3-methylcyclopentadienyl)hafnium dichloride,
dimethylsilanediylbis(4-t-butyl-2-methylcyclopentadienyl)hafnium dichloride,
dimethylsilanediylbis(tetramethylcyclopentadienyl)hafnium dichloride,
dimethylsilanediylbis(indenyl)hafnium dichloride,
dimethylsilanediylbis(2-methyl-1-indenyl)hafnium dichloride,
dimethylsilanediylbis(tetrahydroindenyl)hafnium dichloride,
dimethylsilanediyl(cyclopentadienyl-9-fluorenyl)hafnium dichloride,
dimethylsilanediyl(cyclopentadienyl-2,7-dimethyl-9-fluorenyl)hafnium dichloride,
dimethylsilanediyl(cyclopentadienyl-2,7-di-t-butyl-9-fluorenyl)hafnium dichloride,
diethylsilanediylbis(2,4,5-trimethylcyclopentadienyl)titanium dichloride,
diethylsilanediylbis(2,4-dimethylcyclopentadienyl)titanium dichloride,
diethylsilanediylbis(3-methylcyclopentadienyl)titanium dichloride,
diethylsilanediylbis(4-t-butyl-2-methylcyclopentadienyl)titanium dichloride,
diethylsilanediylbis(tetramethylcyclopentadienyl)titanium dichloride,
diethylsilanediylbis(indenyl)titanium dichloride,
diethylsilanediylbis(2-methyl-1-indenyl)titanium dichloride,
diethylsilanediylbis(tetrahydroindenyl)titanium dichloride,
diethylsilanediyl(cyclopentadienyl-9-fluorenyl)titanium dichloride,
diethylsilanediyl(cyclopentadienyl-2,7-dimethyl-9-fluorenyl)titanium dichloride,
diethylsilanediyl(cyclopentadienyl-2,7-di-t-butyl-9-fluorenyl)titanium dichloride,
diethylsilanediylbis(2,4,5-trimethylcyclopentadienyl)zirconium dichloride,
diethylsilanediylbis(2,4-dimethylcyclopentadienyl)zirconium dichloride,
diethylsilanediylbis(3-methylcyclopentadienyl)zirconium dichloride,
diethylsilanediylbis(4-t-butyl-2-methylcyclopentadienyl)zirconium dichloride,
diethylsilanediylbis(tetramethylcyclopentadienyl)zirconium dichloride,
diethylsilanediylbis(indenyl)zirconium dichloride,
diethylsilanediylbis(2-methyl-1-indenyl)zirconium dichloride,
diethylsilanediylbis(tetrahydroindenyl)zirconium dichloride,
diethylsilanediyl(cyclopentadienyl-9-fluorenyl)zirconium dichloride,
diethylsilanediyl(cyclopentadienyl-2,7-dimethyl-9-fluorenyl)zirconium dichloride,
diethylsilanediyl(cyclopentadienyl-2,7-di-t-butyl-9-fluorenyl)zirconium dichloride,
diethylsilanediylbis(2,4,5-trimethylcyclopentadienyl)hafnium dichloride,
diethylsilanediylbis(3-methylcyclopentadienyl)hafnium dichloride,
diethylsilanediylbis(4-t-butyl-2-methylcyclopentadienyl)hafnium dichloride,
diethylsilanediylbis(tetramethylcyclopentadienyl)hafnium dichloride,
diethylsilanediylbis(indenyl)hafnium dichloride,
diethylsilanediylbis(2-methyl-1-indenyl)hafnium dichloride,
diethylsilanediylbis(tetrahydroindenyl)hafnium dichloride,
diethylsilanediyl(cyclopentadienyl-9-fluorenyl)hafnium dichloride,
diethylsilanediyl(cyclopentadienyl-2,7-dimethyl-9-fluorenyl)hafnium dichloride,
diethylsilanediyl(cyclopentadienyl-2,7-di-t-butyl-9-fluorenyl)hafnium dichloride,
diphenylsilanediylbis(2,4,5-trimethylcyclopentadienyl)titanium dichloride,
diphenylsilanediylbis(2,4-dimethylcyclopentadienyl)titanium dichloride,
diphenylsilanediylbis(3-methylcyclopentadienyl)titanium dichloride,
diphenylsilanediylbis(4-t-butyl-2-methylcyclopentadienyl)titanium dichloride,
diphenylsilanediylbis(tetramethylcyclopentadienyl)titanium dichloride,
diphenylsilanediylbis(indenyl)titanium dichloride,
diphenylsilanediylbis(2-methyl-1-indenyl)titanium dichloride,
diphenylsilanediylbis(tetrahydroindenyl)titanium dichloride,
diphenylsilanediyl(cyclopentadienyl-9-fluorenyl)titanium dichloride,
diphenylsilanediyl(cyclopentadienyl-2,7-dimethyl-9-fluorenyl)titanium dichloride, diphenylsilanediyl(cyclopentadienyl-2,7-di-t-butyl-9-fluorenyl)titanium dichloride,
diphenylsilanediylbis(2,4,5-trimethylcyclopentadienyl)zirconium dichloride,
diphenylsilanediylbis(2,4-dimethylcyclopentadienyl)zirconium dichloride,
diphenylsilanediylbis(3-methylcyclopentadienyl)zirconium dichloride,
diphenylsilanediylbis(4-t-butyl-2-methylcyclopentadienyl)zirconium dichloride,
diphenylsilanediylbis(tetramethylcyclopentadienyl)zirconium dichloride,
diphenylsilanediylbis(indenyl)zirconium dichloride,
diphenylsilanediylbis(2-methyl-1-indenyl)zirconium dichloride,
diphenylsilanediylbis(tetrahydroindenyl)zirconium dichloride,
diphenylsilanediyl(cyclopentadienyl-9-fluorenyl)zirconium dichloride,
diphenylsilanediyl(cyclopentadienyl-2,7-dimethyl-9-fluorenyl)zirconium dichloride,
diphenylsilanediyl(cyclopentadienyl-2,7-di-t-butyl-9-fluorenyl)zirconium dichloride,
diphenylsilanediylbis(2,4,5-trimethylcyclopentadienyl)hafnium dichloride,
diphenylsilanediylbis(3-methylcyclopentadienyl)hafnium dichloride,
diphenylsilanediylbis(4-t-butyl-2-methylcyclopentadienyl)hafnium dichloride,
diphenylsilanediylbis(tetramethylcyclopentadienyl)hafnium dichloride,
diphenylsilanediylbis(indenyl)hafnium dichloride,
diphenylsilanediylbis(2-methyl-1-indenyl)hafnium dichloride,
diphenylsilanediylbis(tetrahydroindenyl)hafnium dichloride,
diphenylsilanediyl(cyclopentadienyl-9-fluorenyl)hafnium dichloride,
diphenylsilanediyl(cyclopentadienyl-2,7-dimethyl-9-fluorenyl)hafnium dichloride, and
diphenylsilanediyl(cyclopentadienyl-2,7-di-t-butyl-9-fluorenyl)hafnium dichloride;
and dimethyl compounds, diethyl compounds, dihydro compounds, diphenyl compounds, dibenzyl compounds, and the like derived by substitution of the chlorine of the above compounds of the transition metal of Group 4 of Periodic Table.

The compound represented by General Formula (13), (14), (15), or (16) includes dichlorides of the transition metals of Group 4 such as
pentamethylcyclopentadienyl-di-t-butylphosphinotitanium dichloride,
pentamethylcyclopentadienyl-di-t-butylamidotitanium dichloride,
pentamethylcyclopentadienyl-n-butoxidotitanium dichloride,
pentamethylcyclopentadienyl-di-t-butylphosphinozirconium dichloride,
pentamethylcyclopentadienyl-di-t-butylamidozirconium dichloride,
pentamethylcyclopentadienyl-n-butoxidozirconium dichloride,
pentamethylcyclopentadienyl-di-t-butylphosphinohafnium dichloride,
pentamethylcyclopentadienyl-di-t-butylamidohafnium dichloride,
pentamethylcyclopentadienyl-n-butoxidohafnium dichloride,
dimethylsilanediyltetramethylcyclopentadienyl-t-butylamidotitanium dichloride,
dimethylsilanediyl-t-butyl-cyclopentadienyl-t-butylamidotitanium dichloride,
dimethylsilanediyltrimethylsilylcyclopentadienyl-t-butylamidotitanium dichloride,
dimethylsilanediyltetramethylcyclopentadienylphenylamidotitanium dichloride,
methylphenylsilanediyltetramethylcyclopentadienyl-t-butylamidotitanium dichloride,
dimethylsilanediyltetramethylcyclopentadienyl-p-n-butylphenylamidotitanium dichloride,
dimethylsilanediyltetramethylcyclopentadienyl-p-methoxyphenylamidotitanium dichloride,
dimethylsilanediyl-t-butylcyclopentadienyl-2,5-di-t-butyl-phenylamidotitanium dichloride,
dimethylsilanediylindenyl-t-butylamidotitanium dichloride,
dimethylsilanediyltetramethylcyclopentadienylcyclohexylamidotitanium dichloride,
dimethylsilanediylfluorenylcyclohexylamidotitanium dichloride,
dimethylsilanediyltetramethylcyclopentadienylcyclododecylamidotitanium dichloride,
dimethylsilanediyltetramethylcyclopentadienyl-t-butylamidozirconium dichloride,
dimethylsilanediyl-t-butyl-cyclopentadienyl-t-butylamidozirconium dichloride,
dimethylsilyltrimethylsilanediylcyclopentadienyl-t-butylamidozirconium dichloride,
dimethylsilanediyltetramethylcyclopentadienylphenylamidozirconium dichloride,
methylphenylsilanediyltetramethylcyclopentadienyl-t-butylamidozirconium dichloride,
dimethylsilanediyltetramethylcyclopentadienyl-p-n-butylphenylamidozirconium dichloride,
dimethylsilanediyltetramethylcyclopentadienyl-p-methoxyphenylamidozirconium dichloride,
dimethylsilanediyl-t-butylcyclopentadienyl-2,5-di-t-butylphenylamidozirconium dichloride,
dimethylsilanediylindenyl-t-butylamidozirconium dichloride,
dimethylsilanediyltetramethylcyclopentadienylcyclohexylamidozirconium dichloride,
dimethylsilanediylfluorenylcyclohexylamidozirconium dichloride,
dimethylsilanediyltetramethylcyclopentadienylcyclododecylamidozirconium dichloride,
dimethylsilanediyltetramethylcyclopentadienyl-t-butylamidohafnium dichloride,
dimethylsilanediyl-t-butyl-cyclopentadienyl-t-butylamidohafnium dichloride,
dimethylsilanediyltrimethylsilylcyclopentadienyl-t-butylamidohafnium dichloride,
dimethylsilanediyltetramethylcyclopentadienylphenylamidohafnium dichloride,
methylphenylsilanediyltetramethylcyclopentadienyl-t-butylamidohafnium dichloride,
dimethylsilanediyltetramethylcyclopentadienyl-p-n-butylphenylamnidohafnium dichloride,
dimethylsilanediyltetramethylcyclopentadienyl-p-methoxyphenylamidohafnium dichloride,
dimethylsilanediyl-t-butylcyclopentadienyl-2,5-di-t-butylphenylamidohafnium dichloride,
dimethylsilanediylindenyl-t-butylamidohafnium dichloride, dimethylsilanediyltetramethylcyclopentadienylcyclohexylamidohafnium dichloride,
dimethylsilanediylfluorenylcyclohexylamidohafnium dichloride, and
dimethylsilanediyltetramethylcyclopentadienylcyclododecylamidohafnium dichloride;

and dimethyl compounds, diethyl compounds, dihydro compounds, diphenyl compounds, dibenzyl compounds, and the like derived by substitution of the chlorine of the above compounds of the transition metal of Group 4 of Periodic Table.

The organoaluminum compound used for preparing the olefin polymerization catalyst of the present invention is represented by General Formula (27):

$$AlR^{16}_3 \quad (27)$$

where each $R^{16}$ is independently hydrogen, halogen, an alkyl or alkoxy group of 1 to 20 carbons, an aryl, aryloxy, arylalkyl, arylalkoxy, alkylaryl, or alkylaryloxy group of 6 to 20 carbons, and at least one $R^{16}$ is an alkyl group.

The organoaluminum compound includes specifically trialkylaluminum compounds such as trimethylaluminum, triethylaluminum, tri-n-propylaluminum, tri(isopropyl) aluminum, tri-n-butylaluminum, tri(isobutyl)aluminum, tri-t-butylaluminum, and triamylaluminum; dialkylaluminum hydrides such as diisobutylaluminum hydride; dialkylaluminum halides such as dimethylaluminum chloride, diethylaluminum chloride, diisobutylaluminum chloride, di-t-butylaluminum chloride, and diamylaluminum chlorides; alkylaluminum dihalides such as methylaluminum dichloride, ethylaluminum dichloride, isobutylaluminum dichloride, t-butylaluminum dichloride, and amylaluminum dichloride; and dialkylaluminum alkoxides such as diethylaluminum ethoxide, but is not limited thereto. Of the above organoaluminum compounds, trialkylaluminum compounds are preferred.

In preparation of the olefin polymerization catalyst of the present invention, the modified clay compound (a) may be a simple one or a mixture of two or more thereof, and the organoaluminum compound (c) represented by General Formula (27) may be a simple one or a mixture of two or more thereof.

In preparation of the olefin polymerization catalyst of the present invention, the method or order of mixing the modified clay compound (a), the transition metal compound (b), and the organoaluminum compound (c) is not limited. For reducing any adverse effect of in-purities in the clay compound, preferably the modified clay compound (a) and a part or the entire of the organoaluminum compound (c) are preliminarily brought into contact with each other.

The above three components of the catalyst are brought into contact with each other in an inert gas atmosphere in a solvent inert to each of the components. The inert solvent includes aliphatic hydrocarbons such as butane, pentane, hexane, heptane, octane, nonane, decane, tetradecane, cyclopentane, and cyclohexane; and aromatic hydrocarbons such as benzene, toluene, and xylene. A halogen-containing compound such as chloroform, methylene chloride, and chlorobenzene may also be used as the solvent. The contact of the components may be conducted at a temperature from −50° C. to the boiling point of the solvent, preferably at room temperature or higher.

The amount of the modified clay compound (a) relative to the transition metal compound (b) is not limited, provided that the transition metal compound (b) entirely reacts with the modified clay compound (a). The modified clay compound (a) contains cation in an amount preferably from 0.01 to 10000 moles, more preferably from 0.1 to 1000 moles, per mole of the transition metal compound (b). The amount of the organoaluminum compound (c) used is not limited, but is preferably not more than 100000 moles per mole of the transition metal compound (b). With the organoaluminum compound exceeding the above limit, an ash removal from the produced polymer is necessary. In consideration of the stabilization of the catalyst and removal of the catalyst poison, the organoaluminum compound (c) is preferably used in an amount from 1 to 10000 moles per mole of the transition metal compound (b).

The transition metal compound (b) as the catalyst component of the present invention may be a mixture of two or more kinds thereof.

The olefin polymerization catalyst of the present invention is useful for any usual olefin polymerization process icluding slurry polymerization, gas-phase polymerization, high-pressure polymerization, solution polymerization, and bulk polymerization. When a solvent is used in olefin polymerization with the olefin polymerization catalyst of the present invention, any organic solvent usually used is useful, including benzene, toluene, xylene, butane, pentane, hexane, heptane, cyclohexane, and methylene chloride. In polymerization of propylene, 1-butene, 1-octene, 1-hexene, and so forth, the olefin itself may be used as the solvent.

The olefin for the polymerization in the present invention may be linear, branched, or cyclic; specifically including α-olefins such as ethylene, propylene, 1-butene, 1-pentene, 4-methyl-1-pentene, 1-hexene, 1-octene, 1-nonene, 1-decene, and styrene; conjugated or non-conjugated dienes such as butadiene, 1,4-hexadiene, 5-ethylidene-2-norbornene, dicyclopentadiene, 4-methyl-1,4-hexadiene, and 7-methyl-1,6-octadiene; cycloolefins such as cyclobutene, but is not limited thereto. The polymerization includes homopolymerization employing one olefin, and copolymerization employing two or more olefins.

In polymerization with the olefin polymerization catalyst of the present invention, the polymerization conditions such as polymerization temperature, polymerization time, polymerization pressure, monomer concentration, and so forth are not limited. Preferably the polymerization is conducted at the polymerization temperature ranging from −100 to 300° C., the polymerization time ranging from 10 seconds to 20 hours, the polymerization pressure ranging from atmospheric pressure to 3500 kg/cm$^2$G. The molecular weight of the polymer can be controlled by use of hydrogen or the like. The polymerization may be conducted by any of a batch system, a semicontinuous system, and a continuous system, and may be conducted in two steps under different polymerization conditions. The polyolefin obtained by the polymerization may be separated from the polymerization solvent and dried by a conventional method.

The present invention is described below in more detail by reference to examples without limiting the invention thereto in any way.

The polymerization, the reaction, and solvent purification were all conducted in an inert gas atmosphere. The solvent and other materials for the reaction were preliminarily purified, dried, and deoxygenated by known methods. The compounds used in the reaction were synthesized and identified by known methods.

The MFR (melt flow rate) of the olefin polymer produced by the present invention was measured according to ASTM D1238, Condition E.

The base plane spacing of the modified clay compound was determined by measuring the positions of 001 base plane reflection with an X-ray diffraction apparatus (manufactured by MAC Science, trade name MXT-18).

The quantity of the cation substituted by the modification reaction was estimated from the change of the sodium content in the clay compound caused by the modification reaction.

The initial catalyst activity was shown by an index, A1/A10 which is a ratio of the integrated ethylene flow rate (Al) one minute after the start of the polymerization to the integrated ethylene flow rate (A10) at the end of the polymerization (10 minutes), and another index, A2/A10 which is a ratio of the integrated ethylene flow rate (A2) 2 minutes after the start of the polymerization to A10. In a high-pressure process in which polymerization is conducted at a high pressure at a high temperature in a short time, a catalyst system is preferred which exhibits high initial activity and is deactivated quickly. That is, a catalyst having higher activity and exhibiting higher A1/A10 and A2/A10 ratios is suitable for such a process.

EXAMPLE 1

Preparation of Modified Clay Compound

To 20 L of deionized water, was added 600 g of a purified montmorillonite (trade name: Kunipia F, produced by Kunimine Kogyo K.K.) to prepare a colloid dispersion. Thereto, 1,8 L of aqueous solution (1 mol/L) of dimethylaniline hydrochloride ($Me_2PhNHCl$) was added, and the mixture was allowed to react for 6 hours. After the reaction, the liquid reaction mixture was filtered, and the collected filter cake was washed with ethanol. The cake was vacuum-dried for 6 hours, and then crushed by a jet mill to obtain 580 g of a modified clay compound having an average particle diameter of 9.3 µm. This modified clay compound had the base plane spacing of 15.0 Å, and contained 1.0 mmol/g of the introduced organic cation.

Preparation of Catalyst

In 10-liter flask, were placed 500 g of the modified clay compound prepared above, and 2 L of toluene. Further thereto, were added 2.6 mol of triisobutylaluminum, and 30 mmol of bis(indenyl)zirconium dichloride. The mixture was stirred at room temperature for 21 hours. The supernatant liquid was removed, and the solid matter was washed with hexane.

Polymerization

In a nitrogen-purged 2-liter autoclave, were placed 1 L of hexane, the solid catalyst slurry (corresponding to 50 mg of solid catalyst) synthesized above, and 2.2 mmol of triisobutylaluminum. Thereto ethylene was introduced at a pressure of 6 $kg/cm^2$ to allow polymerization reaction to proceed at 80° C. for 1.5 hours. After the reaction, the unreacted ethylene was removed, and the reaction solution was poured into ethanol to obtain 110 g of a particulate polymer.

The resulting polymer had an MFR of 0.013 g/10 min, a bulk density of 0.33 $g/cm^3$, and an average particle diameter of 109 µm.

EXAMPLE 2

Preparation of Modified Clay Compound

An aqueous solution of dimethylaniline hydrochloride was prepared by adding 145 g of dimethylaniline ($Me_2PhN$), and 100 mL of aqueous 37% hydrochloric acid into 10 L of deionized water. Thereto, was added 600 g of montmorillonite having an average particle diameter of 7.8 µm prepared by crushing Kunipia F (trade name, produced by Kunimine Kogyo K.K.) by a jet mill. The mixture was allowed to react for 6 hours. After the reaction, the liquid reaction mixture was filtered, and the collected filter cake was washed with ethanol. The cake was vacuum-dried for 6 hours to obtain 640 g of a modified clay compound. The modified clay compound had an average particle diameter of 8.6 µm, the base plane spacing of 15.0 Å, and contained 1.0 mmol/g of the introduced organic cation.

Preparation of Catalyst

A catalyst was prepared in the same manner as shown in "Preparation of Catalyst" in Example 1 except that the modified clay compound was replaced by the one prepared above.

Polymerization

The polymerization was conducted in the same manner as shown in "Polymerization" in Example 1 except that the catalyst was replaced by the one prepared above. Thereby, 130 g of a particulate polymer was obtained which had an MFR of 0.012 g/10 min, a bulk density of 0.35 $g/cm^3$, and an average particle diameter of 102 µm.

EXAMPLE 3

Preparation of Modified Clay Compound

To 20 L of deionized water, was added 600 g of synthetic hectorite (trade name: Raponite RD, produced by Nippon Silica Kogyo K.K.) to prepare a colloid dispersion. Thereto, 1,8 L of aqueous solution (1 mol/L) of dimethylaniline hydrochloride ($Me_2PhNHCl$) was added to deposit an organically modified clay compound. After the reaction, the liquid reaction mixture was filtered, and the collected filter cake was washed with ethanol. The cake was vacuum-dried for 6 hours, and then crushed by a jet mill to obtain 570 g of a modified clay compound having an average particle diameter of 8.8 µm. This modified clay compound had a base plane spacing of 15.0 Å, and contained 0.68 mmol/g of introduced organic cation.

Preparation of Catalyst

A catalyst was prepared in the same manner as shown in "Preparation of Catalyst" in Example 1 except that the above modified clay compound was used.

Polymerization

The polymerization was conducted in the same manner as shown in "Polymerization" in Example 1 except that the catalyst replaced by the one prepared above.

Thereby, 106 g of a particulate polymer was obtained which had an MFR of 0.012 g/10 min, a bulk density of 0.35 $g/cm^3$, and an average particle diameter of 102 µm.

EXAMPLE 4

Preparation of Modified Clay Compound

An aqueous solution of dimethylaniline hydrochloride was prepared by adding 110 g of dimethylaniline ($Me_2PhN$), and 70 mL of aqueous 37% hydrochloric acid into 10 L of deionized water. Thereto, was added 600 g of synthetic hectorite (trade name: Raponite RD, produced by Nippon Silica Kogyo K.K.) crushed by a jet mill. The mixture was allowed to react for 6 hours. After the reaction, the liquid reaction mixture was filtered, and the collected filter cake was washed with ethanol. The cake was vacuum-dried for 6 hours to obtain 625 g of a modified clay compound. The modified clay compound had an average particle diameter of 7.2 µm, and a base plane spacing of 14.8 Å, and contained 0.70 mmol/g of introduced organic cation.

Preparation of Catalyst

A catalyst was prepared in the same manner as shown in "Preparation of Catalyst" in Example 1 except that the modified clay compound was replaced by the one prepared above.

Polymerization

The polymerization was conducted in the same manner as shown in "Polymerization" in Example 1 except that the catalyst was replaced by the one prepared above. Thereby, 135 g of a particulate polymer was obtained which had an MPR of 0.014 g/10 min, a bulk density of 0.35 g/m$^3$, and an average particle diameter of 98 µm.

EXAMPLE 5

Preparation of Modified Clay Compound

To one liter of 20% sulfuric acid, was added 100 g of montmorillonite having an average particle diameter of 7.8 µm. The mixture was allowed to react at 100° C. for 3 hours. After the reaction, the solid matter was washed sufficiently with hot deionized water. The washed solid matter was vacuum-dried for 6 hours, and crushed by a pulverizer to obtain acid-treated montmorillonite having an average particle diameter of 8.5 µm.

Preparation of Catalyst

A catalyst was prepared in the same manner as shown in "Preparation of Catalyst" in Example 1 except that the modified clay compound was replaced by the one prepared above.

Polymerization

The polymerization was conducted in the same manner as shown in "Polymerization" in Example 1 except that the catalyst was replaced by the one prepared above. Thereby, 55 g of a particulate polymer was obtained which had an MFR of 0.013 g/10 min, a bulk density of 0.30 g/cm$^3$, and an average particle diameter of 85 µm.

Comparative Example 1

Modified montmorillonite was prepared in the same manner as in Example 1 except that the jet mill crush was not conducted. The modified montmorillonite had an average particle diameter of 65 µm. The catalyst preparation and the polymerization were conducted in the same manner as in Example 1 except that the modified clay compound was replaced by the above one.

As the result, the polymer was obtained in a yield of as low as 52 g. The obtained polymer had an MFR of 0.013 g/10 min, a bulk density of 0.18 g/cm$^3$ and an average particle diameter of 320 µm.

Comparative Example 2

Modified montmorillonite was prepared in the same manner as in "Preparation of Modified Clay Compound" in Example 2 except that the montmorillonite having an average particle diameter of 7.8 µm was replaced by montmorillonite having an average particle diameter of 25 µm. The resulting modified montmorillonite had an average particle diameter of 28 µm. The catalyst preparation and the polymerization were conducted in the same manner as in Example 1 except that the modified clay compound was replaced by the above one.

As the result, the polymer was obtained in a yield of as low as 55 g. The obtained polymer had an MFR of 0.013 g/10 min, a bulk density of 0.19 g/cm$^3$, and an average particle diameter of 250 µm.

Comparative Example 3

Modified synthetic hectorite was prepared in the same manner as in "Preparation of Modified Clay Compound" in Example 4 except that the synthetic hectorite having an average particle diameter of 6.0 µm was replaced by synthetic hectorite having an average particle diameter of 30.0 µm. The resulting modified synthetic hectorite had an average particle diameter of 35 µm. The catalyst preparation and the polymerization were conducted in the same manner as in Example 1 except that the modified clay compound was replaced by the above modified synthetic hectorite.

As the result, the polymer was obtained in a yield of as low as 60 g. The obtained polymer had an MFR of 0.015 g/10 min, a bulk density of 0.22 g/cm$^3$, and an average particle diameter of 340 µm.

Comparative Example 4

The catalyst preparation and the polymerization were conducted in the same manner as in Example 1 except that the modified montmorillonite was replaced by unmodified montmorillonite having an average particle diameter of 7.8 µm.

As the result, only one gram of polymer was obtained.

EXAMPLE 6

Into a polymerization vessel having a capacity of 300 L, were continuously fed 100 kg/h of hexane, 25.0 kg/h of ethylene, 1.2 kg/h of 1-butene, and 1.42 g/h of the solid catalyst obtained in Example 1. Triisobutylaluminum was also fed thereto continuously to keep the triisobutylaluminum concentration at 18 mmol per kg of hexane. The polymerization temperature was controlled at 85° C.

The slurry containing the polymer formed in the polymerization vessel was introduced through a flash tank, and a pump to a centrifuge, where the polymer is separated from hexane. The polymer was dried continuously. About 80 kg of the dried polymer was taken out every 4 hours. The catalyst activity was 14000 g per gram catalyst per hour. The powdery polymer had an average particle diameter of 405 µm, a bulk density of 0.42 g/cm$^3$, an MFR of 0.54 g/10 min, and a density of 0.945 g/cm$^3$.

EXAMPLE 7

Polymerization was conducted in the same manner as in Example 6 except that the solid catalyst was replaced by the one prepared in Example 4 and the catalyst was fed at a rate of 1.50 g/h.

About 110 kg of the dried polymer was taken out every 4 hours. The catalyst activity was 18300 g per gram catalyst per hour. The powdery polymer had an average particle diameter of 450 µm, a bulk density of 0.45 g/cm$^3$, an MFR. of 0.63 g/10 min, and a density of 0.945 g/cm$^3$.

EXAMPLE 8

Into a polymerization vessel having a capacity of 300 L, were continuously fed 100 kg/h of hexane, 25.0 kg/h of ethylene, and 1.6 g/h of the solid catalyst obtained in Example 2. Triisobutylaluminum was also fed thereto continuously to keep the triisobutylaluminum concentration at 20 mmol per kg of hexane. The polymerization temperature was controlled at 85° C.

The slurry containing the polymer formed in the polymerization vessel was introduced through a flash tank, and a pump to a centrifuge, where the polymer is separated from hexane. The polymer was dried continuously. About 100 kg of the dried polymer was taken out every 4 hours. The catalyst activity was 15600 g per gram catalyst per hour. The powdery polymer had an average particle diameter of 285 μm, a bulk density of 0.42 g/cm³, an MFR of 0.51 g/10 min, and a density of 0.955 g/cm³.

Comparative Example 5

Polymerization was conducted in the same manner as in Example 6 except that the solid catalyst was replaced by the one prepared in Comparative Example 1 and the catalyst was fed at a rate of 4.6 g/h.

However, the obtained powdery polymer had an average particle diameter of 700 μm to overload the centrifuge. Thereby the polymerization was stopped after 3 hours of operation. About 35 kg of the dried polymer was taken out every one hour. The polymer had a bulk density of 0.32 g/cm³, an MFR of 0.53 g/10 min, and density of 0.949 g/cm³.

EXAMPLE 9

In a 1-liter autoclave purged by nitrogen, were placed 600 mL of saturated $C_9$–$C_{13}$ hydrocarbon solvent (trade name IP Solvent 1620, produced by Idemitsu Petrochemical Co.), and 20 mL of 1-hexene. Ethylene was fed to keep the internal pressure at 21 kgf/cm², and the temperature of the autoclave was controlled to be at 170° C. Thereto, was added 12 mL of hexane containing 12.5 mg of modified montmorillonite having an average particle diameter of 8.6 μm synthesized in the same manner as in Example 2, 0.5 μmol of diphenylmethylene(cyclopentadienyl)(fluorenyl) zirconium dichloride, and 0.15 mmol of triethylaluminum. The polymerization was conducted for 10 minutes.

The initial polymerization activity indexes (A1/A10) and (A2/A10) were 0.23 and 0.48 respectively.

After the polymerization, the unreacted ethylene was removed, and ethanol was poured to the reaction solution to obtain 65 g of polymer.

EXAMPLE 10

The polymerization was conducted in the same manner as in Example 9 except that the modified montmorillonite having an average particle diameter of 8.6 μm was replaced by synthetic hectorite of an average particle diameter of 7.2 μm prepared as in Example 4.

The values of (A1/A10) and (A2/A10) were 0.18, and 0.35 respectively. The weight of the polymer obtained was 75 g.

Comparative Example 6

The polymerization was conducted in the same manner as in Example 9 except that the modified montmorillonite of average particle diameter of 8.6 μm was replaced by modified montmorillonite having an average particle diameter of 25 μm prepared in Comparative Example 2.

The values of (A1/A10) and (A2/A10) were 0.10, and 0.27 respectively. The weight of the polymer obtained was 35 g.

Comparative Example 7

The polymerization was conducted in the same manner as in Example 9 except that the modified montmorillonite of average particle diameter of 8.6 μm was replaced by synthetic hectorite having an average particle diameter of 30.0 μm prepared in Comparative Example 3.

The values of (A1/A10) and (A2/A10) were 0.10, and 0.20 respectively. The weight of the polymer obtained was 40 g.

The use of the catalyst of the present invention improves the initial polymerization behavior, and produces an olefin polymer of less ash content at a high productivity, as described above. The modified clay compound, a component of the catalyst of the present invention, is excellent in storage stability, and can be prepared in less number of production steps.

What is claimed is:

1. An olefin polymerization catalyst comprising a modified clay compound (a) having an average particle diameter of less than 10 μm, a transition metal compound (b), and an organoaluminum compound (c), wherein the modified clay compound is formed by contacting a laminar clay compound with an onium compound represented by the following formula (29):

$$[R^{19}{}_n GH]^+[A]^- \qquad (29)$$

wherein G is an element selected from Groups 15 and 16 of the Periodic Table, each $R^{19}$ is independently a hydrogen atom or a hydrocarbon group of 1 to 20 carbon atoms and at least one $R^{19}$ is a hydrocarbon group of 1 to 20 carbon atoms, and n=3 when G is selected from Group 15 and n=2 when G is selected from Group 16, and $[A]^-$ is a counter ion.

2. The olefin polymerization catalyst according to claim 1, wherein the transition metal compound (b) is a compound of a transition metal of Group 4 of Periodic Table represented by General Formula (1):

(1)

or General Formula (2):

(2)

where $M^1$ is an atom of titanium, zirconium, or hafnium; each Y is independently a hydrogen atom, a halogen atom, an alkyl group of 1 to 20 carbons, or an aryl, arylalkyl, or alkylaryl group of 6 to 20 carbons; $R^1$ and $R^2$ are independently a ligand represented by General Formula (3), (4), (5), or (6):

(3)

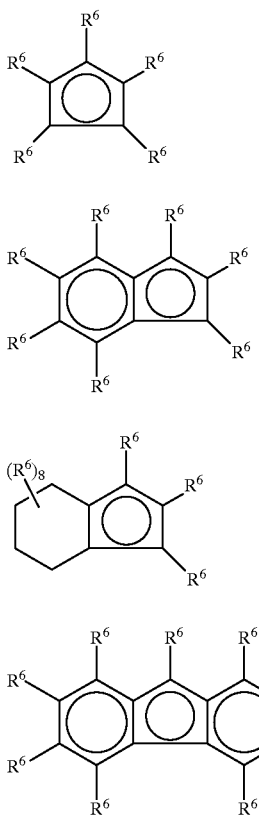

(4)

(5)

(6)

(where each $R^6$ is independently a hydrogen atom, an alkyl group of 1 to 20 carbons, or an aryl, arylalkyl, or alkylaryl group of 6 to 20 carbons);

the ligands forming a sandwich structure together with $M^1$; $R^3$, and $R^4$ are independently a ligand represented by General Formula (7), (8), (9), or (10):

(7)

(8)

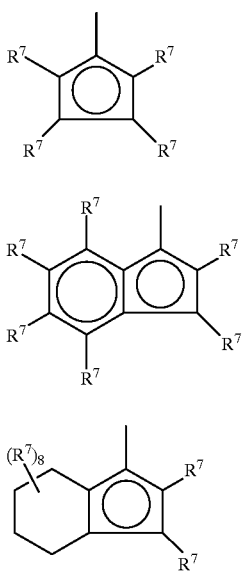

(9)

-continued

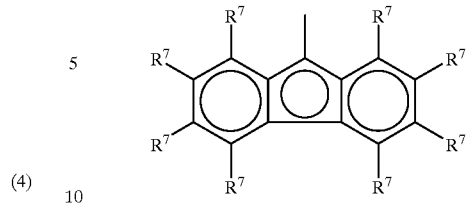
(10)

(where each $R^7$ is independently a hydrogen atom, an alkyl group of 1 to 20 carbons, or an aryl, arylalkyl, or alkylaryl group of 6 to 20 carbons);

the ligands forming a sandwich structure together with $M^1$;

$R^5$ is a group represented by General Formula (11) or (12):

(11)

(12)

(where each $R^8$ is independently a hydrogen atom, an alkyl group of 1 to 20 carbons, or an aryl, arylalkyl, or alkylaryl group of 6 to 20 carbons; and $M^2$ is an atom of silicon, germanium, or tin), $R^5$ forming a bridge between $R^3$ and $R^4$; and m is an integer of 1 to 5.

3. The olefin polymerization catalyst according to claim 1, wherein the transition metal compound (b) is a compound of a transition metal of Group 4 of the Periodic Table represented by General Formula (13), (14), (15), or (16):

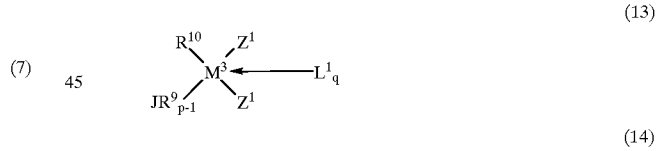
(13)

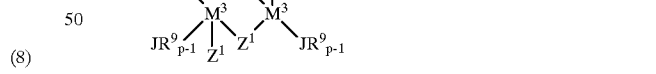
(14)

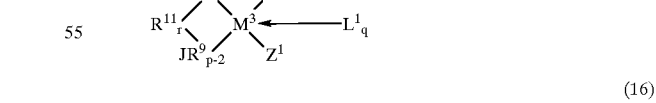
(15)

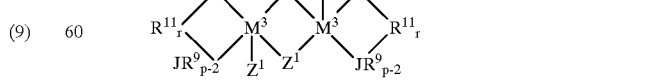
(16)

where each $M^3$ is independently an atom of titanium, zirconium, or hafnium; each $Z^1$ is independently a hydrogen atom, a halogen atom, an alkyl group of 1 to 20 carbons, or an aryl, arylalkyl, or alkylaryl group of 6 to 20 carbons; $L^1$ is a Lewis base; q is an integer of 0 to 3; $JR^9_{p-1}$ and $JR^9_{p-2}$ are respectively a heteroatom ligand, J being an element of Group 15 of the Periodic Table having a coordination number 3 or an element of Group 16 of the Periodic Table having a coordination number 2; each $R^9$ is independently a hydrogen atom, a halogen atom, an alkyl or alkoxy group of 1 to 20 carbons, or an aryl, aryloxy, arylalkyl, arylalkoxy, alkylaryl, or alkylaryloxy group of 6 to 20 carbons; p is a coordination number of the element J; each $R^{10}$ is independently a ligand represented by General Formula (17), (18), (19), or (20):

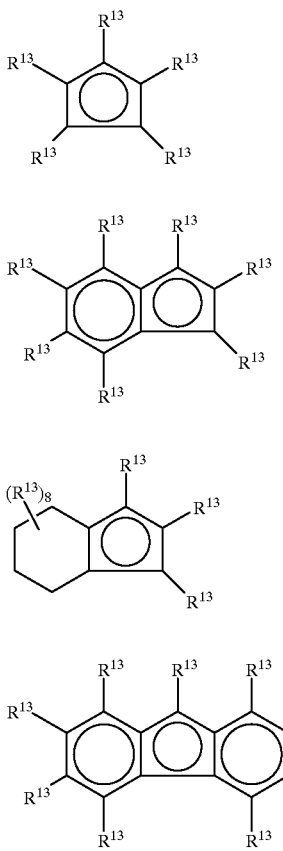

where each $R^{13}$ is independently a hydrogen atom, an alkyl group of 1 to 20 carbons, or an aryl, arylalkyl, or alkylaryl group of 6 to 20 carbons;

each $R^{12}$ is a ligand represented by General Formula (21), (22), (23), or (24):

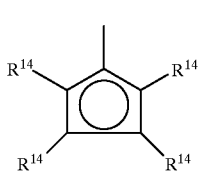

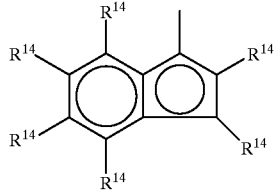

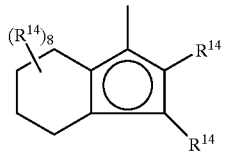

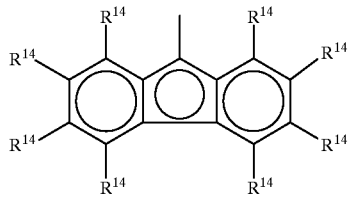

where each $R^{14}$ is independently a hydrogen atom, an alkyl group of 1 to 20 carbons, or an aryl, arylalkyl, or alkylaryl group of 6 to 20 carbons;

$R^{11}$ is a group represented by General Formula (25) or (26):

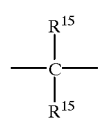

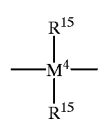

where each $R^{15}$ is independently a hydrogen atom, an alkyl group of 1 to 20 carbons, or an aryl, arylalkyl, or alkylaryl group of 6 to 20 carbons; and $M^4$ is an atom of silicon, germanium, or tin, $R^{11}$ forming a bridge between $R^{12}$ and $JR^9_{p-2}$; and r is an integer of 1 to 5.

4. The olefin polymerization catalyst according to claim 1, wherein the organoaluminum compound (c) is represented by General Formula (27):

$$AlR^{16}_3 \qquad (27)$$

where each $R^{16}$ is independently hydrogen, halogen, an alkyl or alkoxy group of 1 to 20 carbons, an aryl, aryloxy, arylalkyl, arylalkoxy, alkylaryl, or alkylaryloxy group of 6 to 20 carbons, and at least one of $R^{16}$ is an alkyl group.

5. A process for producing an olefin polymer comprising polymerizing or copolymerizing a linear, branched, or cyclic olefin or olefins in the presence of the olefin polymerization catalyst set forth in any of claims 1 to 4.

6. The olefin polymerization catalyst according to claim 2, wherein the organoaluminum compound (c) is represented by General Formula (27):

 (27)

where each $R^{16}$ is independently hydrogen, halogen, an alkyl or alkoxy group of 1 to 20 carbons, an aryl, aryloxy, arylalkyl, arylalkoxy, alkylaryl, or alkylaryloxy group of 6 to 20 carbons, and at least one of $R^{16}$ is an alkyl group.

7. The olefin polymerization catalyst according to claim 3, wherein the organoaluminum compound (c) is represented by General Formula (27):

 (27)

where each $R^{16}$ is independently hydrogen, halogen, an alkyl or alkoxy group of 1 to 20 carbons, an aryl, aryloxy, arylalkyl, arylalkoxy, alkylaryl, or alkylaryloxy group of 6 to 20 carbons, and at least one of $R^{16}$ is an alkyl group.

8. The olefin polymerization catalyst according to claim 1, wherein the clay compound is selected from the group consisting of pyrophylite, kaolinite, dickite, talcs, smectities, vermiculites, micas having a negative charge of about 1 and brittle micas having a negative charge of about 2.

9. The olefin polymerization catalyst according to claim 1, wherein G is a nitrogen atom to form an ammonium compound, a phosphorus atom to form a phosphonium compound, an oxygen atom to form an oxonium compound or a sulfur atom to form a sulfonium compound.

10. The olefin polymerization catalyst according to claim 1, wherein $R^{19}$ is selected from the group consisting of a $C_1$–$C_{20}$ alkyl group, a $C_1$–$C_{20}$ alkenyl group, a $C_6$–$C_{20}$ aryl group and $C_7$–$C_{20}$ arylalkyl group.

* * * * *